March 1, 1927. 1,619,504
H. D. GABRIEL
AUTOMATICALLY OPERATED END GATE FOR DUMP VEHICLES
Filed Aug. 25, 1926 4 Sheets-Sheet 1
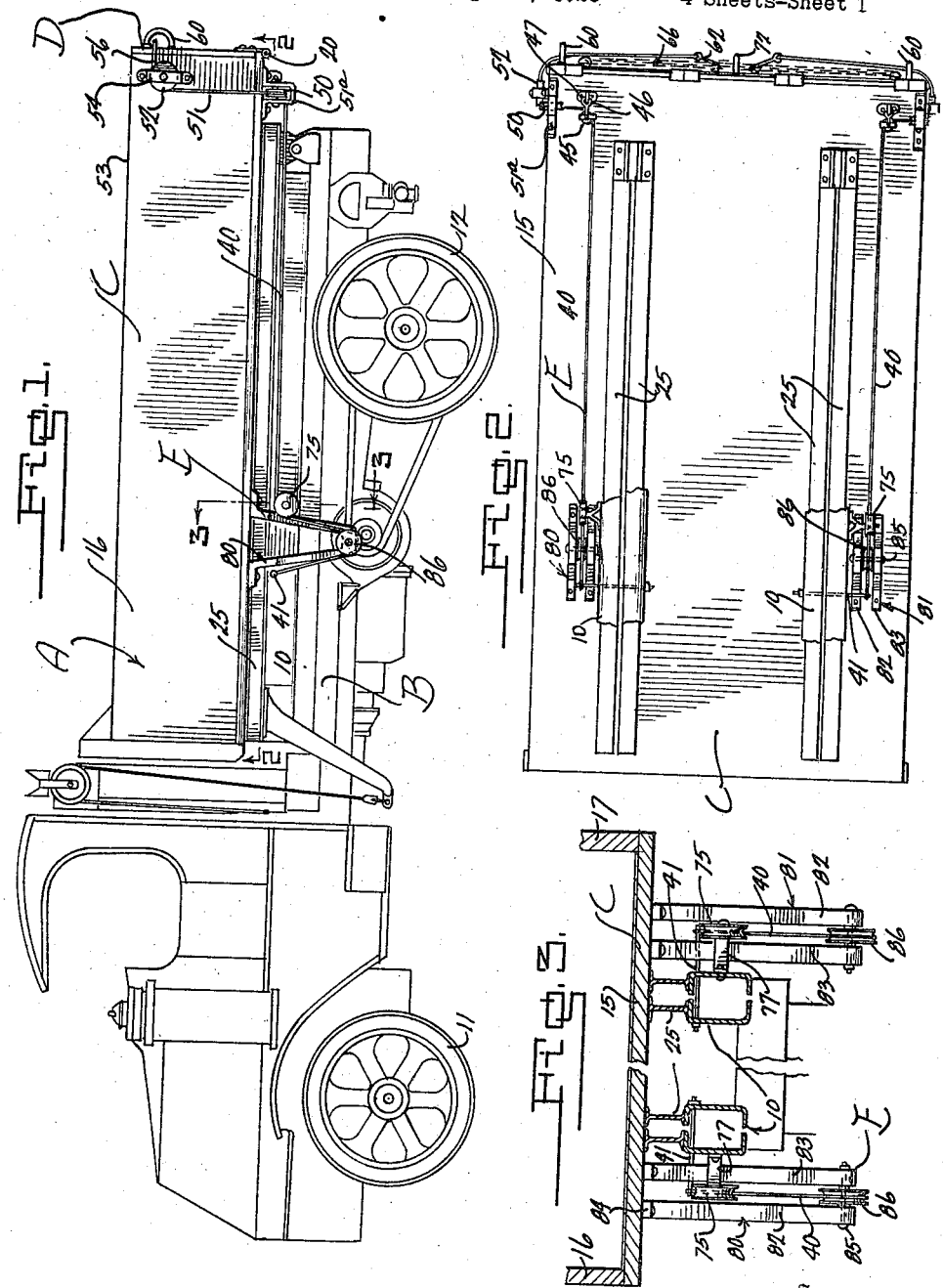
Inventor
Herbert D. Gabriel
By Lancaster and Allwine
Attorneys

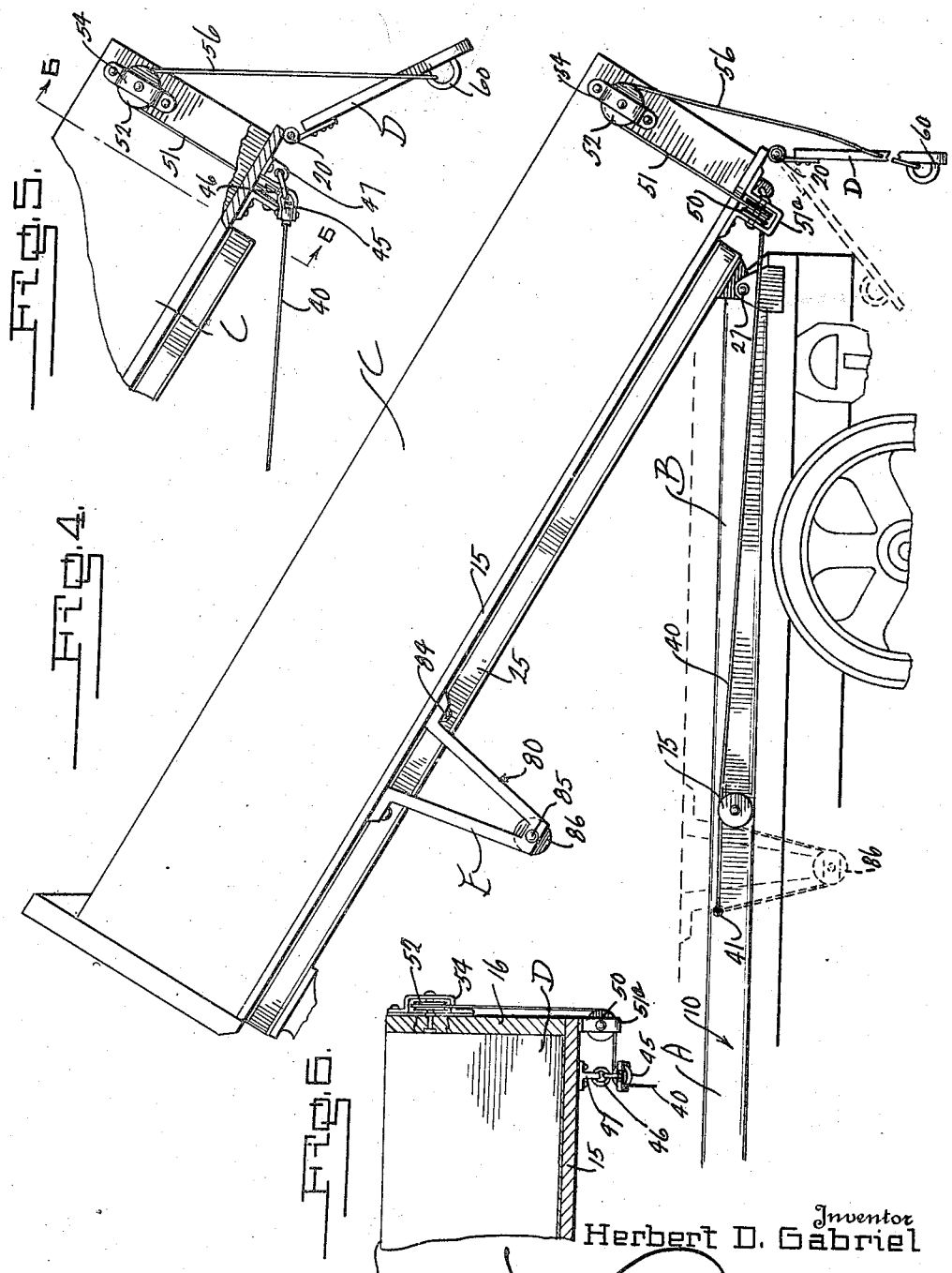

March 1, 1927. 1,619,504
H. D. GABRIEL
AUTOMATICALLY OPERATED END GATE FOR DUMP VEHICLES
Filed Aug. 25, 1926 4 Sheets-Sheet 3
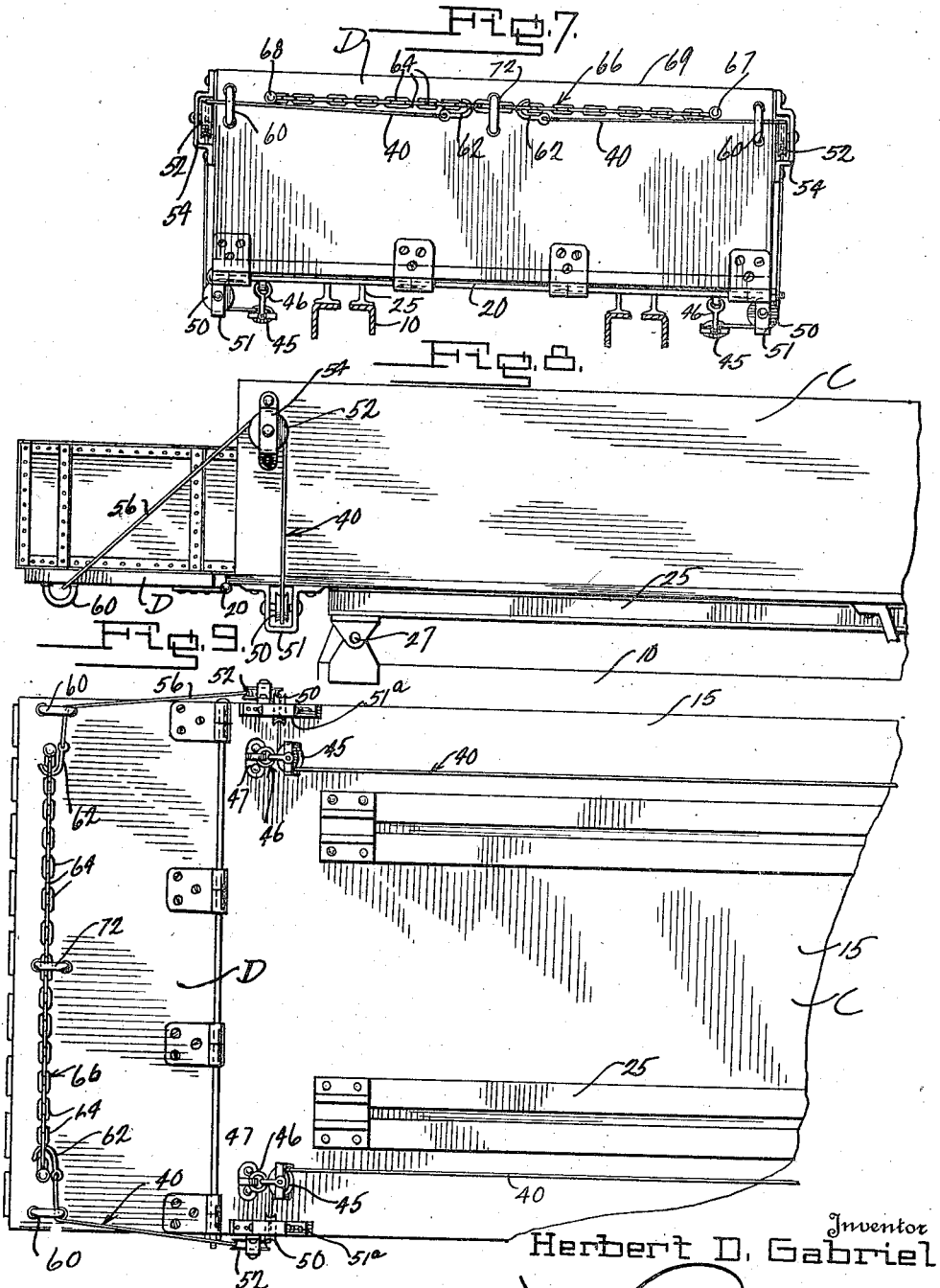
Inventor
Herbert D. Gabriel

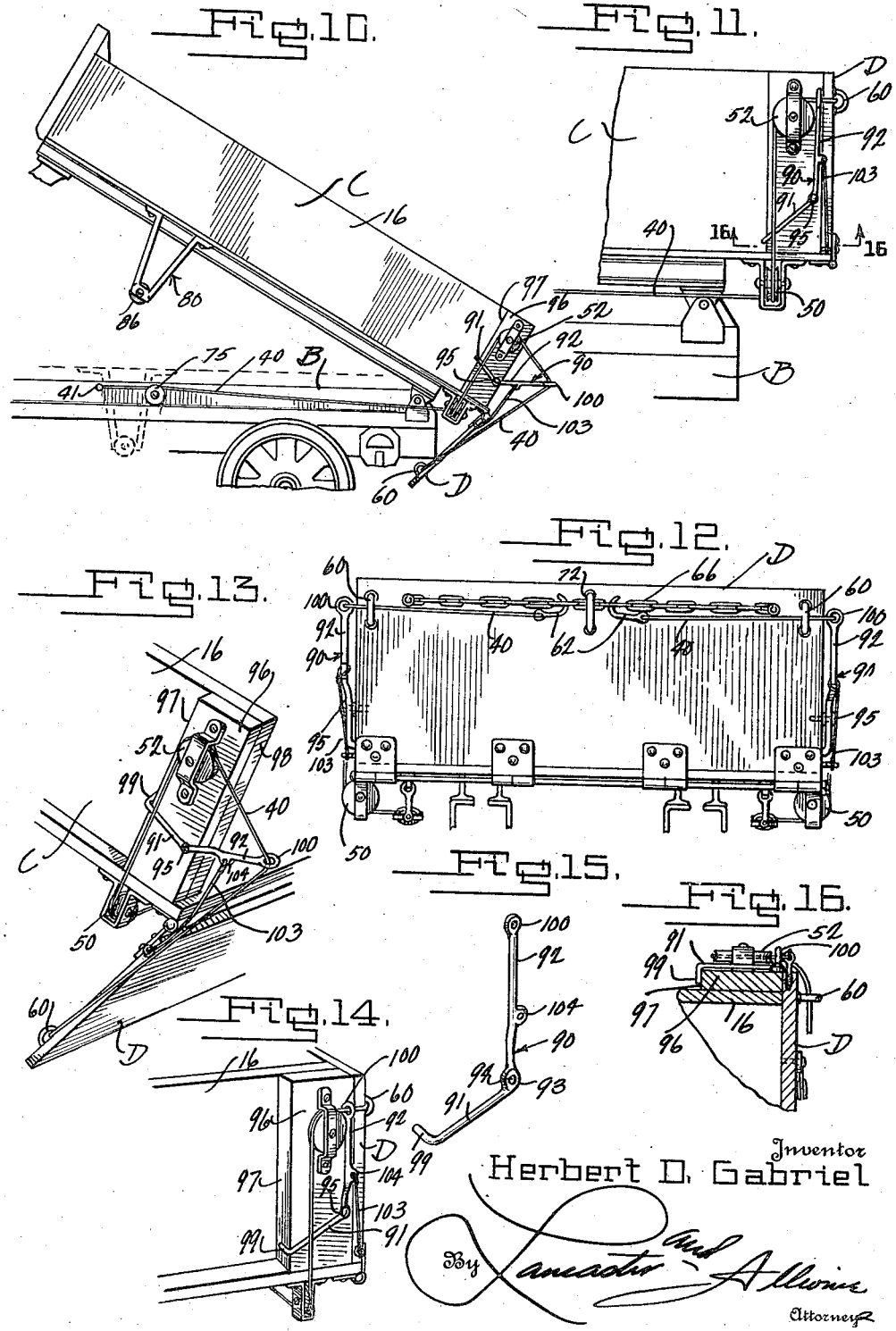

Patented Mar. 1, 1927.

1,619,504

UNITED STATES PATENT OFFICE.

HERBERT D. GABRIEL, OF NEW YORK, N. Y.

AUTOMATICALLY-OPERATED END GATE FOR DUMP VEHICLES.

Application filed August 25, 1926. Serial No. 131,496.

This invention relates to improvements in vehicles, the same being particularly directed to the provision of an automatically operable board or end gate for the movable dump bodies of trucks and other vehicles.

The primary object of the invention is the provision of means to automatically open the end gate of the hinged mounted types of dump body, upon the upward swing of the dump body.

A further object of this invention is the provision of an improved automatically operated end gate or tail board for movable types of dump bodies of automotive vehicles, comprising improved means connected with the end gate, dump body and chassis of the vehicle to open and close the end gate according to the elevated or lowered movements of the dump body with respect to the chassis.

Other objects and advantages of this invention will be apparent during the course of the following detailed description.

In the accompanying drawings wherein for the purpose of illustration is shown only a preferred embodiment of this invention, Figure 1 is a side elevation of a truck, showing the improved means to operate the end gate of the movable dump body thereof.

Figure 2 is a bottom plan view of details of the gate operating means, the view being taken substantially on the line 2—2 of Figure 1.

Figure 3 is a fragmentary transverse sectional view of the operating details of the end gate of the vehicle dump body, the view being taken substantially on the line 3—3 of Figure 1.

Figure 4 is a fragmentary side elevation showing the elevated relation of the dump body with respect to its vehicle, and showing the operating features for causing an automatic opening of the end gate as the vehicle dump body is elevated.

Figure 5 is a detailed arrangement of the end gate operating means, adjacent and beneath the dump body.

Figure 6 is a sectional view of the end gate operating means taken substantially on the line 6—6 of Figure 5.

Figure 7 is a rear view of the dump body, showing the end gate or tail board and the manner for adjustably connecting the operating means thereto to permit various adjusted openings of the tail gate.

Figure 8 is a side elevation showing the dump body lowered upon the chassis with the end gate supported in an open position, and from which position the end gate may be lowered upon elevation of the dump body, the adjustment for this relation of parts being secured with the details illustrated in Figure 7.

Figure 9 is a bottom plan view of the details of the end gate, in the relation of parts illustrated in Figure 8.

Figure 10 is a view showing the end gate and the automatic feed operating means as including means to facilitate the easy closing of the end gate from a wide open position.

Figure 11 is a view of the means to facilitate the closing of the end gate.

Figure 12 is a rear view of the end gate with the improved means for enabling easy closing thereof.

Figures 13 and 14 are respectively perspective views in wide open and closed positions of the gate with the improved means to facilitate closing thereof.

Figure 15 is a perspective view of a novel lever member to facilitate closing of the end gate.

Figure 16 is a sectional view taken substantially on the line 16—16 of Figure 11.

In the drawings, wherein similar reference characters designate corresponding parts throughout the several views, the letter A may generally designate the vehicle, such as a truck, which includes a chassis frame B, upon which a dump body C is movably connected; the dump body C including an end gate or tail board D of the movable type, which is operated by means E connected upon the dump body C, the frame B, and tail gate D, to cause the automatic opening and lowering of the tail gate according to the elevation and lowering of the dump body.

Referring to the chassis B, the same includes the stationary frame 10, consisting of side beams at each side thereof, of the double channel type, as illustrated in Figure 3 of the drawings; this frame 10 being provided with suitable front and rear running gear 11 and 12 respectively, of any approved and conventional type.

The dump body C may be of various types, but in the illustration shown the same comprises a floor 15, having upstanding side retaining walls 16 and 17 thereon, to provide an article receiving compartment in the body, the rear end of which is controlled by an end gate or tail board D, which is preferably hinged at 20 to the rear end of the floor 15 in any approved manner so that the said tail board or end gate D swings upwardly to a closed position on the dump body, and may swing downwardly to open the rear end of the compartment of the dump body, in accordance with conventional construction. Rigid on the bottom of the floor 15 are I beams or other supports 25, adapted for abutment upon the top surfaces of the channels of the frame 10, in accordance with ordinary construction; the rear end of the I beams 25 having means to hingedly connect the body with the rear end of the frame 10, as at 27, so that the body C may be moved from the horizontal position illustrated in Figure 1, on the hinges at the rear end of the frame 10, or swung upwardly to release the contents of the body, that is, to incline the same.

The inconvenience of opening and closing the end gates of such types of dump bodies as above described is well understood.

Referring now to the automatic means for operating the end gate D according to the elevated or lowered relation of the dump body C on the chassis frame 10, flexible side cables 40 are provided at each side of the frame 10, that is along the outer side of each of the side rails of the frame 10; said cables 40 being of any approved durable material, such as flexible wire. These cables 40 are connected at their forward ends upon pins or other means 41 which are rigidly secured in the side rails of the frame, at opposite sides of the chassis, so as to extend laterally from the outer sides of said side rails. For purposes of accessibility the cables 40 are extended close to and along the outer sides of each of the side rails of the frame 10, and the pins 41 are located closer to the forward swinging end of the dump body C than to the hinged connection of said dump body. The cables 40 extend towards the hinged connection 27 of the dump body, and just rearwardly of the hinged connection 27 of the dump body C, the cables 40 are laterally outturned and trained about the pulleys 45 of a swinging type of pulley construction 46, which is attached at each of the rear corners of the body C, upon the bottom of the floor 15 of said body C, as is illustrated in Figure 2 of the drawings. These swinging types of pulley constructions 46 are best illustrated in Figure 9 of the drawings, and include the pulley portions 45 about which the cables 40 are trained; the pulley portions 45 being connected by links or other connecting means to brackets 47 which are the portions to be attached to the floor of the body C. The cables 40 are then laterally turned outwardly towards the outer sides of the vehicle body, and are trained beneath and outwardly over pulleys 50 which are rotatably mounted upon suitable brackets 51ª. The planes of the pulleys 50 are at right angles to the longitudinal axis of the vehicle, and the pulleys 50 are so located that the cables 40 trained thereover extend upwardly along the outer sides 16 and 17 of the body C, in close relation with said outer sides of the dump body. In order to effect this arrangement the pulleys 50 have their grooved cable receiving portions projecting beyond the plane of the outer surface of the sides of the dump body.

The cables 40 are extended about the pulleys 50 and brought upwardly at 51 along the opposite sides of the dump body C, and are then trained over pulleys 52 rotatably mounted at the rear ends upon the opposite sides 16 and 17 of the dump body, close to the top edges 53 of said sides 16 and 17. These pulleys 52 are disposed in planes parallel with the longitudinal axis of the dump body C, and they are protected by guard means 54 which forms a protecting housing therefor. The cables 40 are trained about the grooves of these pulleys 52 and then turned rearwardly at 56 and extended about the rear surface of the end gate D, being threaded thru suitable guide eyes or loops 60 which are secured at the top corners on the rear surface of the tail gate D. The cables 40 are then inturned towards the center of the tail gate D, and at their free ends are provided with hooks 62 which may detachably engage in any of a plurality of links 64 of a chain 66. The chain 66 is connected at its ends 67 and 68 on the rear surface of the tail gate D, parallel with the top edge 69 of said tail gate; the said chain 66 extending for preferably the entire length of the tail gate, and at its central portion being threaded through a suitable staple or retaining loop 72.

On each of the side rails of the frame 10, in rearwardly spaced relation with respect to the forward connection 41 of the cables 40, pulleys 75 are rotatably mounted upon brackets 77 secured to the outer sides of the side rails of the frame 10; the pulleys 75 being grooved and disposed in vertical planes, and over the top edges of which the cables 40 are trained. The portions of the cables 40 between the connections 41 and pulleys 75 are adapted to receive means thereagainst, carried by the dump body C, to cause a forward pull upon the cables 40 as the truck body C is being lowered, to automatically effect a closing operation of the tail gate D. Such means consists in the provision of thrust arm constructions 80 and 81 at opposite sides of the vehicle body C, attached to the floor 15 thereof and depending therebelow, operating at the outer sides of the frame rails of the chassis. Each of these thrust arm constructions 80 and 81 consist in the provision of a pair of substantially V-shaped arms or extensions 82 and 83, in closely spaced relation, and at their upper ends are connected at 84 to the bottom surface of the floor 15 of the body, and at their lower ends the same rotatably support a pin or shaft 85 on which a grooved pulley 86 is rotatably mounted. The grooved pulleys 86 lie in the same plane with the pulleys 75 at the respective sides of the vehicle, to engage the cable 40 as the truck body C is lowered, as is readily apparent from the drawings.

Assuming the truck body C to be lowered as illustrated in Figure 1, upon the chassis frame, in this position the thrust arms 80 and 81 will have engaged the cables 40 at opposite sides of the chassis, and pushed the said cables downwardly between their hinged connections 41 and the pulleys 75, thus pulling the cables forwardly to move the end gate D closed. The thrust arms are thus positioned between the forward connections of the cables and the pulleys 75, so that the pulleys 86 of said thrust arms are disposed at a much lower point than the pulleys 75, when the body C is lowered. As the body C is now elevated upon its pivot 27, the thrust arms 80 and 81 are of course permitted to move upwardly, and the cables 40 shorten between the connections 41 and the pulleys 75, permitting the cables 40 to feed rearwardly. The weight of the end gate D as well as any materials in the body C will tend to open the end gates D according to the degree of feed of the cables 40, incident to elevation of the body C, and when the body C is elevated as illustrated in Figure 4 the thrust arms will have entirely disengaged the cables 40, and incident to the slack of the cables by rise of the thrust arms, the end gate D will open automatically and permit the articles in the truck body C to be dumped, as can readily be understood.

Under some circumstances the gate D may be opened to a greater degree of movement than under other circumstances, and for this purpose the hooks 62 are adjustable along the chain links 64 to permit such regulation of the opening of the gate D.

In many instances, as where long timbers or girders are being hauled, it is desirable to have the end gate D horizontally positioned when the body is horizontally located in a lowered position, as is illustrated in Figure 8, and under these circumstances the hooks 62 are adjustable along the links 64 to the outer ends of the end gates, and when the body of the truck is lowered so that the thrust arms take effect, the added length of the cables 40, by reason of the adjustment of the hook ends thereof along the chain 66, will place the end gate D in a horizontal position, when the truck body is lowered. Of course, when the truck body C is elevated the end gate D will be lowered from its horizontal position, in a manner above described, and as is perfectly obvious.

From the foregoing description of this invention it is apparent that a novel type of automatically controlled end gate for the dump bodies of vehicles has been provided, which embodies a simple and practical arrangement of parts to efficiently control the opening of the end gates as the dump body is elevated to dump the contents therefrom. The principal feature of the automatic operation is the fact that a cable is provided which is attached at one end to the end gate and at its opposite end to either the chassis frame or the movable body, the length of the cable between its end connections being such that when the same is extended fully, the end gate will swing to an open position, but incident to the provision of the thrust arms to shorten the length of the cable, the cable will be shortened when the dumping body is lowered. These thrust arms may either be carried by the truck body or the chassis, depending upon the front end connection of the cable. If the front end connection of the cable is connected to the chassis, as illustrated in the drawings, the thrust arms must be carried by the movable body, whereas if the front end of the cable is connected to the movable body the thrust arms must then be carried by the chassis to effect the function above described.

It is to be understood that there is sufficient slack in the cable 40 when the truck body is elevated so that the end gate may swing wide open to a position beneath the bottom of the truck body, so that the contents of the body may be entirely dumped in the conventional manner, by reciprocating the truck back and forth during the load dumping operation, and during this operation the end gate abutting against a solid part of the truck to limit its wide open position, and preventing snapping of the cables 40.

As is illustrated in Figures 10 to 16 inclusive, means in the nature of a lever is provided to facilitate the closing of the end gate from a wide open position. Ordinarily, with the cable extending directly from the side pulley 52 to the end gate D, with the latter wide open, it would be a difficult matter to close the end gate merely by pulling upon the cable 40, in view of the fact that the cable 40 from the pulley 52 to its connection with the end gate, in a straight line, will have passed the hinged connection of the end gate when the latter is in a position illustrated by the dotted lines in Figure 4 of the drawings. While ordinarily the truck body in its elevated relation will vertically support the end gate D in a vertical position, and in which case the cable is in position so that a pull thereon will close the end gate, there are occasions when it will be desirable to control the cable between the side pulleys 52 and the end connections of the cable with the end gate, so that tight pull on the cables will responsively move the end gates to a closed position, without excessive strain upon the cables. To this end, novel bell crank lever members 90 are provided, pivoted at each of the side walls of the truck body C, adjacent the end gate D. Each of these bell crank levers 90 includes the arm portion 91 and 92, which at their juncture are preferably flat and provided with an aperture 94 to receive a pivot pin or element 95 by means of which the said bell crank levers may be respectively pivoted at opposite sides of the truck body to the rear thereof. The side walls 16 and 17 of the truck body C on the outer surfaces thereof at the rear ends thereof, are provided with vertical retaining pieces or strips 96, providing the forwardly facing vertical shoulders 97, and it is on the outer side of these strips or members 96 that the bell crank levers 90 are mounted at opposite sides of the truck body, so that the bell crank levers pivotally move in vertical planes at opposite sides of the said truck body C. Pivot locations of the said bell crank levers are adjacent the rearmost edges 98 of the truck body side walls 16 and 17, so that the normally upwardly extending arm portions 92 may swing to substantially vertical collapsed position along the said members 96, when the truck body C is lowered, or may swing rearwardly beyond the rear edges 98 of the side walls of the truck body, for a purpose to be subsequently described. At the forward ends of the arm portions 91 each of the bell crank levers 90 is laterally inturned at 99, adapted to abut against the shoulder 97 of the respective piece 96 to which it is pivoted, to limit the collapsed and extended positions of the other arm portion 92, as will be apparent from Figures 11, 13 and 14 of the drawings.

The use of all details of the invention as heretofore described is the same for the invention which uses the improved member 90 and its attachments. The cables 40, however, at each of the sides of the truck, are threaded through apertured eyes 100 provided at the free ends of the arm portions 92, at a location intermediate the pulleys 52 and the connection of the cables 40 with the end gate D.

In closed position the arm portions 92 of the bell crank levers 90 are disposed substantially vertical along opposite sides of the truck, forwardly of the end gate construction D and in a non-obstructing relation therewith. In this position the inner ends 99 of the arm portion 91 abut against the forward facing shoulders 97 in an order to limit the collapsed relation of the said bell crank levers 90 to the position illustrated in Figures 11 and 14 of the drawings.

As the end gate D is swung to an open position, the bell crank levers 90 will be moved on pivot pins 95, to swing the arms 92 rearwardly beyond the rear edges of the truck body C and more especially beyond the hinged connection of the end gate on the body C. The positive rearward movement of the said levers 90 upon opening of the end gate D is occasioned by the provision of small cables or connecting cords 103, connected at their lower ends to the end gate D in spaced relation with the hinged connection thereof, and at their opposite ends said cords 103 being connected to eyes 104 on the arm portions 92 of the levers 90, intermediate the ends of said arm portions 92. As the end gate D is swung open the arms 92 of the bell crank levers 90 will be swung rearwardly, and since the cables 40 at the sides of the vehicle body are threaded thru the eyes 100 at the free ends of the said arm portions 92, the cables 40 will be swung rearwardly at their locations intermediate the pulleys 52 and their end connections on the end gate D, to diagonally position the cables 40 from the threaded eyes 100 to their connections with the end gate D, so that the cables will not swing past the dead center at the hinged connection of the end gate D, and the said cables are in position to enable the quick closing as well as facile closing of the end gate D upon lowering the truck body C until the thrust members 80 at the forward ends of said truck body render said cables taut to effect the function above described in closing the end gate.

The rearward movement of the arms 92 is limited by the engagement of the inner extending ends 99 of the arm portions 91 with the forwardly facing faces 97 as above defined and as well illustrated in Figures 10 and 13 of the drawings.

Upon the closing of the end gate D, the cables 40 between their connections with the end gate D and the pulleys 52 will of course be rendered taut and have a tendency to draw on a straight line between the pulleys 52 and the end connections of said cables with the end gate D, and this brings the levers 90 back into the collapsed position illustrated in Figure 11 of the drawings, as can be readily understood.

Various changes in the shape, size, and arrangement of parts may be made to the forms of inventions herein shown and described, without departing from the spirit of the invention or the scope of the claims.

I claim:

1. In an automatically operated end gate construction for dump vehicles the combination of a chassis frame, a dump body movably mounted on the chassis frame, an end gate movably mounted on the dump body, a cable, means connecting the cable with the end gate, the cable extending forwardly from the end gate along the chassis frame, means connecting the forward end of the cable on the chassis frame, pulley means on the chassis frame over which the cable is trained in a spaced relation with the forward connected end of said cable, and a thrust arm carried by the dump body in a depending relation for engaging the cable between its forwardly connected end and said pulley means upon lowering of the dump body, to double the cable intermediate its forward connection and said pulley means, whereby to shorten the length of the cable from the pulley means to the end gate for the purpose of closing the end gate as the dump body is lowered.

2. In an automatically operated end gate construction for dump vehicles the combination of a chassis frame, a dump body movably mounted on the chassis frame, an end gate movably mounted on the dump body, a cable, means connecting the cable with the end gate, the cable extending forwardly from the end gate along the chassis frame, means connecting the forward end of the cable on the chassis frame, pulley means on the chassis frame over which the cable is trained in a spaced relation with the forward connected end of said cable, a thrust arm carried by the dump body in a depending relation for engaging the cable between its forwardly connected end and said pulley means upon lowering of the dump body, to double the cable intermediate its forward connection and said pulley means, whereby to shorten the length of the cable from the pulley means to the end gate for the purpose of closing the end gate as the dump body is lowered, and means for adjustably connecting the rear end of the cable at various places along the end gate.

3. In an automatically operated end gate construction for vehicles the combination of a chassis frame, a pivoted dump body on the chassis frame, a pivoted end gate for the dump body, a cable, means connecting the cable at its rear end to the end gate, pulley means carried by the dump body at its rear end on a side thereof and on the bottom thereof for receiving the cable in a trained relation thereover to receive the cable beneath the dump body, means connecting the forward end of the cable to the chassis frame at a location beneath the dump body, pulley means on the chassis frame in spaced relation with the means which connects the forward end of said cable, and a thrust arm connected with the dump body forwardly of its pivoted end and depending below said dump body for engaging the cable between the last mentioned pulley means and the cable's forwardly connected end whereby to double the cable intermediate its ends forwardly of the last mentioned pulley means for causing a pull on the cable to swing the end gate closed as the dump body is lowered upon the chassis frame.

4. In an automatically operated end gate construction for vehicles the combination of a chassis frame, a pivoted dump body on the chassis frame, a pivoted end gate for the dump body, a cable, means connecting the cable at its rear end to the end gate, pulley means carried by the dump body at its rear end, on a side thereof, and on the bottom thereof for receiving the cable in a trained relation thereover to receive the cable beneath the dump body, means connecting the forward end of the cable to the chassis frame at a location beneath the dump body, pulley means on the chassis frame in spaced relation with the means which connects the forward end of said cable, a thrust arm connected with the dump body forwardly of its pivoted end and depending below said dump body for engaging the cable between the last mentioned pulley means and the cable's forwardly connected end whereby to double the cable intermediate its ends forwardly of the last mentioned pulley means for causing a pull on the cable to swing the end gate closed as the dump body is lowered upon the chassis frame, and means for adjustably connecting the rear end of the cable at various points along and across the end gate to regulate the closing degree of the end gate when the dump body is fully lowered upon the chassis frame.

5. In an automatically operated end gate construction for dump vehicles the combination of a chassis frame, a rear end pivoted dump body on the chassis frame, an end gate pivoted on the dump body, a pair of cables, a member on the rear end of the end gate across the same, means carried at the rear ends of said cables for adjustment along said member to connect said rear ends of the cables at various locations across the end gate, said cables extending about the ends of said end gate at opposite sides of the vehicle, pulleys at opposite sides of the dump body on the rear thereof over which said cables are trained from the end gate, pulley means on the bottom of the dump body at the rear end thereof over which the cables are trained at opposite sides of the dump body from the first mentioned pulleys, said cables extending forwardly along the outer sides of the chassis frame, means to connect the forward ends of said cables upon the chassis frame with connections which do not move forwardly of the chassis frame, pulleys rotatably mounted at the outer sides of the chassis frame in spaced relation with the forwardly connected ends of said cables and over which the cables are trained, and depending thrust arm constructions carried by the dump body forwardly of the pivoted end thereof and at opposite sides thereof including pulleys on the lower ends thereof for engaging the cables at opposite sides of the chassis frame between their forward connected ends and the pulleys which are mounted on the chassis frame whereby to double the cables intermediate their ends as the thrust arm pulleys come into engagement with said cables upon lowering of the dump body and to pull forwardly on the cables and swing the end gate to a closed position.

6. In an automatically operated end gate for vehicles the combination of a vehicle chassis, a movable dump body upon the vehicle chassis, an end gate hingedly connected with the movable body, a flexible cable connected with the end gate, means operably associating the cable with the movable dump body, thrust means to cause a releasing movement of the cable to permit opening of the end gate upon elevation of the dump body to a dumping position, and a movable arm carried by the dump body and movable to a rearwardly extending relation with respect to the dump body upon opening of the end gate to move the cable rearwardly to a position where the end gate may be closed with ease upon drawing the cable taut.

7. In an automatically operated end gate construction for dump vehicles, the combination of a chassis frame, a dump body movably mounted on the chassis frame, an end gate movably mounted on the dump body, a cable, means connecting the cable with the end gate, means movably connecting the cable with the dump body for guiding the cable, means for rendering the cable slack when the dump body is moved to a dumping position to permit opening of the end gate, and means to move the cable rearwardly between the connection of the same with the end gate and its rear movable connection with the dump body to enable the easy closing of the end gate from an open to a closed position.

8. In combination with a chassis, a dump body pivoted at its rear end on the rear end of the chassis, a pivoted end gate for the dump body, a cable connected to the end gate, means slidably receiving the cable in a guiding relation at the rear end of the dump body, an arm pivoted on the dump body having an eye for slidably receiving the cable therethrough at a location intermediate said last mentioned means and the connection of the cable on the end gate, and means for extending said arm rearwardly of the truck body upon opening of the end gate to move the cable rearwardly to a position where the end gate may be closed with ease upon drawing of the cable taut.

9. In an automatically operated end gate construction for vehicles the combination of a chassis frame, a dump body movably mounted on the chassis frame, an end gate movably connected to the dump body so as to swing open upon elevation of the dump body, a cable, means connecting the cable to the end gate, means connecting the cable to the chassis frame in cooperation with the last mentioned means so that when the dump body is elevated on the chassis frame the cable will have sufficient slack in it to enable the gate to open, and a thrust arm carried by the dump body to engage the cable when the dump body is lowered to render the cable taut and shorten the effective length thereof between the above first and second mentioned means to cause the gate to move to a closed position.

10. In an automatically operated end gate construction for vehicles the combination of a chassis frame, a dump body movably mounted on the chassis frame, an end gate movably connected to the dump body so as to swing open upon elevation of the dump body, a cable, means connecting the cable to the end gate for transverse adjustable positioning along the end gate, means connecting the cable to the chassis frame in cooperation with the last mentioned means so that when the dump body is elevated on the chassis frame the cable will have sufficient slack in it to enable the gate to open, and a thrust arm carried by the dump body to engage the cable when the dump body is lowered to render the cable taut and shorten the effective length thereof between the above first and second mentioned means to cause the gate to close, the adjustable connection of the cable on the end gate being such as to permit a desired opening of the gate upon a predetermined elevation of the dump body.

HERBERT D. GABRIEL.